United States Patent [19]

Beitz et al.

[11] Patent Number: 4,779,162

[45] Date of Patent: Oct. 18, 1988

[54] UNDER OIL ARRESTER

[75] Inventors: David W. Beitz; John P. DuPont, both of Waukesha, Wis.

[73] Assignee: RTE Corporation, Brookfield, Wis.

[21] Appl. No.: 26,076

[22] Filed: Mar. 16, 1987

[51] Int. Cl.[4] .............................................. H02H 9/04

[52] U.S. Cl. .................................... 361/127; 361/117; 361/130; 361/40; 338/21

[58] Field of Search .................... 338/21, 20; 361/127, 361/128, 126, 117, 38, 39, 40, 129, 130

[56] References Cited

U.S. PATENT DOCUMENTS

| | | | |
|---|---|---|---|
| 3,018,406 | 1/1962 | Innis | 361/117 X |
| 3,018,407 | 1/1962 | Innis | 361/117 X |
| 4,153,921 | 5/1979 | Kresge et al. | 361/40 X |
| 4,278,961 | 7/1981 | Schroeder et al. | 338/21 |
| 4,326,187 | 4/1982 | Miyoshi et al. | 338/21 X |
| 4,333,861 | 6/1982 | Aoki et al. | 338/21 X |
| 4,352,139 | 9/1982 | Du Pont et al. | 361/117 |
| 4,352,140 | 9/1982 | Axelsson et al. | 361/127 |

FOREIGN PATENT DOCUMENTS

| | | | |
|---|---|---|---|
| 0033420 | 9/1984 | European Pat. Off. | 361/117 |

*Primary Examiner*—A. D. Pellinen
*Assistant Examiner*—H. L. Williams
*Attorney, Agent, or Firm*—James E. Lowe, Jr.

[57] ABSTRACT

An arrester for use under oil in an electrical apparatus, the arrester comprising a first contact assembly, a plurality of valve blocks, a second contact assembly, and a conductive cement serially electrically connecting the first contact assembly, each of the plurality of valve blocks, and the second contact assembly. The arrester also includes a thin insulative inert to oil coating completely covering the plurality of valve blocks, the coating and the cement permitting electrical separation of the valve blocks in the event of electrical destruction of the valve blocks.

12 Claims, 1 Drawing Sheet

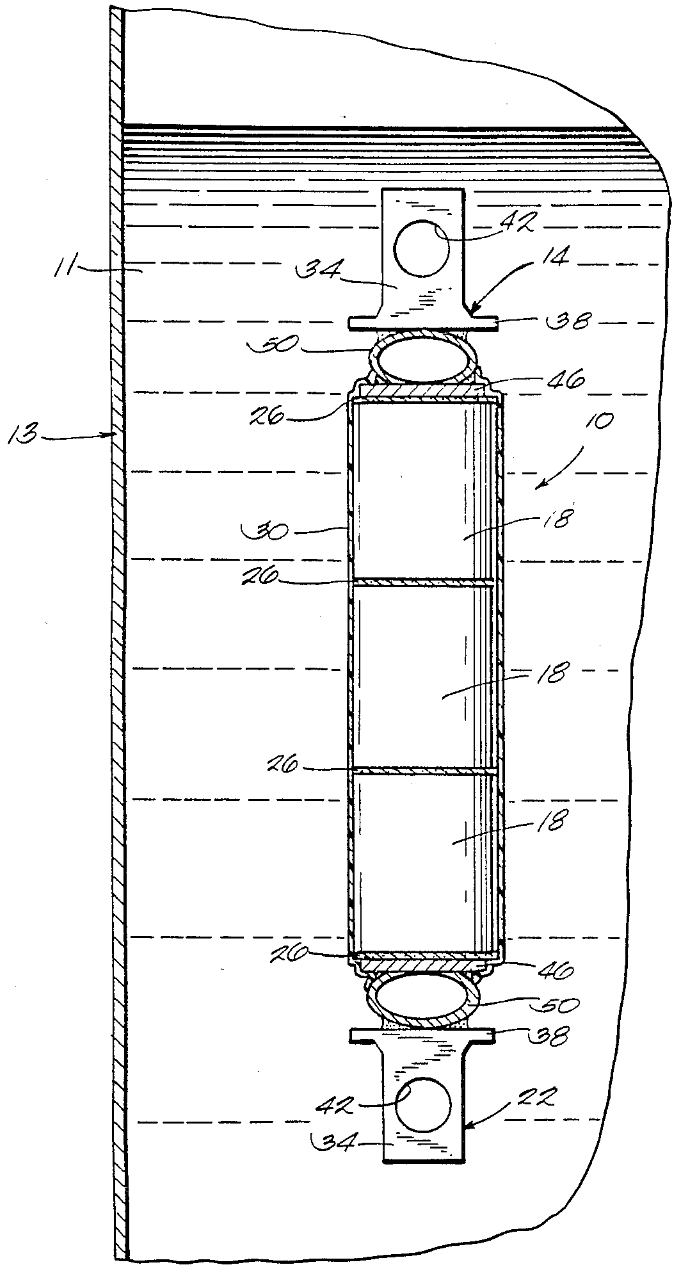
42
11
34
14
38
50
46
26
13
10
30
18
26
18
26
18
26
46
50
38
42
22
34

UNDER OIL ARRESTER

BACKGROUND OF THE INVENTION

This invention relates to surge arresters, and, more particularly, to high voltage circuit surge arresters intended to be used under oil in electrical apparatus.

Surge arresters have been used for electrical apparatus for a number of years. Many of these arresters have included a plurality of valve blocks connected electrically in series. Some of the arresters have also been located in the electrical apparatus and under the dielectric fluid or oil. A problem found with known under oil arrester constructions however, is that in circumstances where electrical destruction of the valve blocks occurs because of the absorption by the valve blocks of excess thermal energy, a low resistant fault path through the valve blocks occurs and the arresters no longer provide their protective function but, instead, act as a conductor or a fault on the electrical circuit.

SUMMARY OF THE INVENTION

One of the principal features of the invention is the provision of a surge arrester for use under oil in an electrical apparatus, which surge arrester facilitates the likelihood of electrical separation of the arrester valve blocks in the event of electrical destruction of the valve blocks so that the arrester does not act as a conductor or a fault on the electrical circuit.

Another of the principal features of the invention is the provision of a surge arrester for use under oil in an electrical apparatus, which surge arrester prevents the oil from interacting with the valve blocks while enhancing the heat transfer characteristic of the arrester.

More particularly, this invention provides an arrester for use under oil in an electrical apparatus, the arrester comprising a first contact assembly, a plurality of valve blocks, a second contact assembly, and conductive adhesive means for serially electrically connecting the first contact assembly, each of the plurality of valve blocks, and the second contact assembly. The arrester also includes a thin insulative coating completely covering the plurality of valve blocks, the coating and the adhesive means permitting electrical separation of the valve blocks in the event of electrical destruction of the valve blocks.

In one embodiment, the valve blocks are metal oxide varistor blocks, the insulative coating is inert to oil and of a thermoset nature and the conductive adhesive means is an electrically conductive silver epoxy cement.

Various other feature of the invention are set forth in the following brief description of the drawings, the description of the preferred embodiment, and the appended claims.

BRIEF DESCRIPTION OF THE DRAWING

The figure is an illustration of the arrester in use under oil in an electrical apparatus.

DESCRIPTION OF THE PREFERRED EMBODIMENT

Illustrated in the drawing is an arrester 10 situated under oil 11 in an electrical apparatus 13 such as a transformer. Although not illustrated in the drawing, one end of the arrester 10 would be connected to a lead connected to low or ground potental, while the other end of the arrester 10 would be connected to a high voltage electric circuit susceptible to high voltage surges such as those caused by lightning strikes. The arrester 10 will discharge the high voltage surge in order to protect electrical equipment connected to the high voltage electrical circuit.

The arrester 10 comprises a first contact assembly 14, a plurality of valve blocks 18, a second contact assembly 22, conductive adhesive means 26 for serially electrically connecting the first contact assembly 14, each of the plurality of valve blocks 18, and the second contact assembly 22 and a thin insulative coating 30 completely covering the plurality of valve blocks 18. More particularly, the first and second contact assemblies 14 and 22 each comprise a cylindrical lug 34 made of electrically conductive material and including a lower flange 38. Means is provided for connecting each contact assembly to a lead connected to low or ground potential or to a high voltage electrical circuit. More particularly, this means is in the form of an opening 42 extending through the cylindrical portion of the lug 34 at an angle perpendicular to the longitudinal axis of the lug 34.

Each of the contact assemblies 14 and 22 also includes a generally flat circular contact plate 46 and a contact wiee 50. The contact wire 50 is made of an electrically conductive material such as copper. The wire 50 is formed into a generally oval shape with one side of the oval being spot welded to the lug flange 38 and the other side of the oval being spot welded to the contact plate 46. The contact plate 46 is also made of electrically conductive material. This type of contact assembly or flexible connector is described in U.S. Pat. No. 4,352,139 issued Sept. 28, 1982, which is incorporated herein by reference.

In the preferred embodiment, the valve blocks 18 are made of metal oxide varistor material, and are generally cylindrical in shape and have an outer insulative coating or grading resistance layer (not shown).

As described above, the conductive adhesive means 26 electrically connects the first contact assembly 14, the plurality of valve blocks 18 and the second contact assembly 22 in series. More particularly, in the preferred embodiment, the conductive adhesive means 26 is in the form of a conductive cement consisting of a two component silver-filled epoxy having a smooth thixotropic paste consistency. Such a paste can be purchased from General Fiberglass Supply, Inc., Epic Resins Division, and is sold under the name "Epic Resins S7203". The two components include a resin S7203A and a hardener S7203B which are mixed in a one to one ratio to form a very soft paste. The paste is applied so as to completely cover the end of each of the blocks 18. The blocks 18 and contact plates 46 are then placed in abutting relationship, with each conductive surface abutting another conducting surface. The cement is then cured at 120° C. for eleven hours. In other embodiments, solder can be used as the conductive adhesive.

After the first contact assembly 14, the plurality of valve blocks 18, and the second contact assembly 22 are adhered together in this fashion, the thin insulative coating 30 is applied so as to completely cover the plurality of valve blocks 18. Although other materials can be used in other embodiments, in the preferred embodiment, the thin insulative coating 30 is in the form of a paint which is sprayed onto the plurality of valve blocks 18. In the preferred embodiment, the paint 30 is applied to a thickness of between three to eight thousands of an inch. This paint 30 is an inert-to-oil protective coating of a thermoset natue, such as an epoxy or a polyester, especially a polyester powder. More particularly, the following product has been found to be acceptable: Glidden Product 5E-109 Polyester. This material is sufficiently thin and brittle so that in the event of the electrical destruction of the valve blocks 18 because of thermal expansion of the valve blocks, the coating 30 and conductive cement 26 will permit electrical separation of the valve blocks 18.

Although arresters have previously been used under oil in an electrical apparatus, the arrester 10 of this invention reduces the package size, maximizes the heat transfer, minimizes oil impregnation into the valve blocks 18, and better assures that the arrester 10 will be open-circuited in the event of the electrical destruction of the valve blocks 18.

It is known in the industry that a chemical reaction between the transformer oil and the grading resistance layer on the outside circumference of the valve blocks can result in a significant increase in leakage current through the grading resistance layer on the valve blocks. This can lead to the eventual thermal runaway and self-destruction of the blocks. The inert-to-oil coating 30 of this invention helps prevent oil impregnation of the valve blocks 18.

When the valve blocks electrically destruct, a fault current passes through the blocks and causes rapid thermal heating and expansion of the metal oxide varistor blocks. This rapid thermal heating and expansion results in a splitting of the valve blocks which tends to cause the valve blocks to separate. The conductive cement 26 and thin insulative coating 30 used in this invention permit the valve blocks 18 to split, separate and fall freely to the bottom of the electrical apparatus 13 so as to open the circuit between the two contact assemblies 14 and 22 to thereby extinguish the fault current flowing through the valve blocks 18.

Various of the other features of the invention are set forth in the following claims.

We claim:

1. A complete arrester assembly for use under oil in an electrical apparatus, said arrester assembly consisting of a first contact assembly,
a plurality of valve blocks,
a second contact assembly,
conductive adhesive means for serially electrically connecting said first contact assembly, each of said plurality of valve blocks, and said second contact assembly, and
a thin insulative coating completely covering said plurality of valve blocks, said coating providing a continuous cover which extends between said first contact assembly and said second contact assembly and which prohibits oil from reaching said plurality of valve blocks, said coating and said adhesive means permitting electrical separation of said valve blocks in the event of electrical destruction of said valve blocks.

2. An arrester in accordance with claim 1 wherein said conductive adhesive means comprises an electrically conductive silver epoxy cement.

3. An arrester in accordance with claim 1 wherein said thin insulative coating is inert-to-oil and of a thermoset nature.

4. An arrester in accordance with claim 3 wherein said thin insulative coating is a polyester powder.

5. An arrester in accordance with claim 1 wherein said valve blocks are metal oxide varistor valve blocks.

6. A complete arrester assembly for use under oil in an electrial apparatus, said arrester assembly consisting of, a first contact assembly,
a plurality of metal oxide varistor valve blocks,
a second contact assembly,
a conductive silver epoxy cement serially electrically connecting said first contact assembly, each of said plurality of valve blocks, and said second contact assembly, and
a thin insulative coating which is inert-to-oil and of a theroset nature and which completely covers said plurality of valve blocks, said coating providing a continuous cover which extends between said first contact assembly and said second contact assembly and which prohibits oil from reaching said plurality of valve blocks, said coating and said cement permitting electrical separation of said valve blocks in the event of electrical destruction of said valve blocks.

7. An arrester in accordance with claim 6 wherein said thin insulative coating is a polyester powder.

8. An electrical apparatus, said apparatus comprising
a housing including oil therein, and
a complete arrester assembly, said arrester assembly comprising
a first contact assembly,
a plurality of valve blocks,
a second contact assembly,
conductive adhesive means for serially electrically connecting said first contact assembly, each of said plurality of valve blocks, and said second contact assembly, and
a thin insulative coating completely covering said plurality of valve blocks, said coating providing a continuous cover which extends between said first contact assembly and said second contact assembly and which prohibits oil from reaching said plurality of valve blocks, said coating and said adhesive means permitting electrical separation of said valve blocks in the event of electrical destruction of said valve blocks.

9. An arrester in accordance with claim 8 wherein said conductive adhesive means comprises an electrically conductive silver epoxy cement.

10. An arrester in accordance with claim 8 wherein said thin insulative coating is inert-to-oil and of a thermoset nature.

11. An arrester in accordance with claim 10 wherein said thin insulative coating is a polyester powder.

12. An arrester in accordance with claim 8 wherein said valve blocks are metal oxide varistor valve blocks.

* * * * *